"SINGLE BREAK" ANNEALING WITH $R_1 < R_2$

May 17, 1966  R. GARDON  3,251,671
METHOD OF ANNEALING OF GLASS RIBBON
Filed Feb. 5, 1962  9 Sheets-Sheet 3

INVENTOR.
ROBERT GARDON
BY
Oscar H. Spencer
ATTORNEY

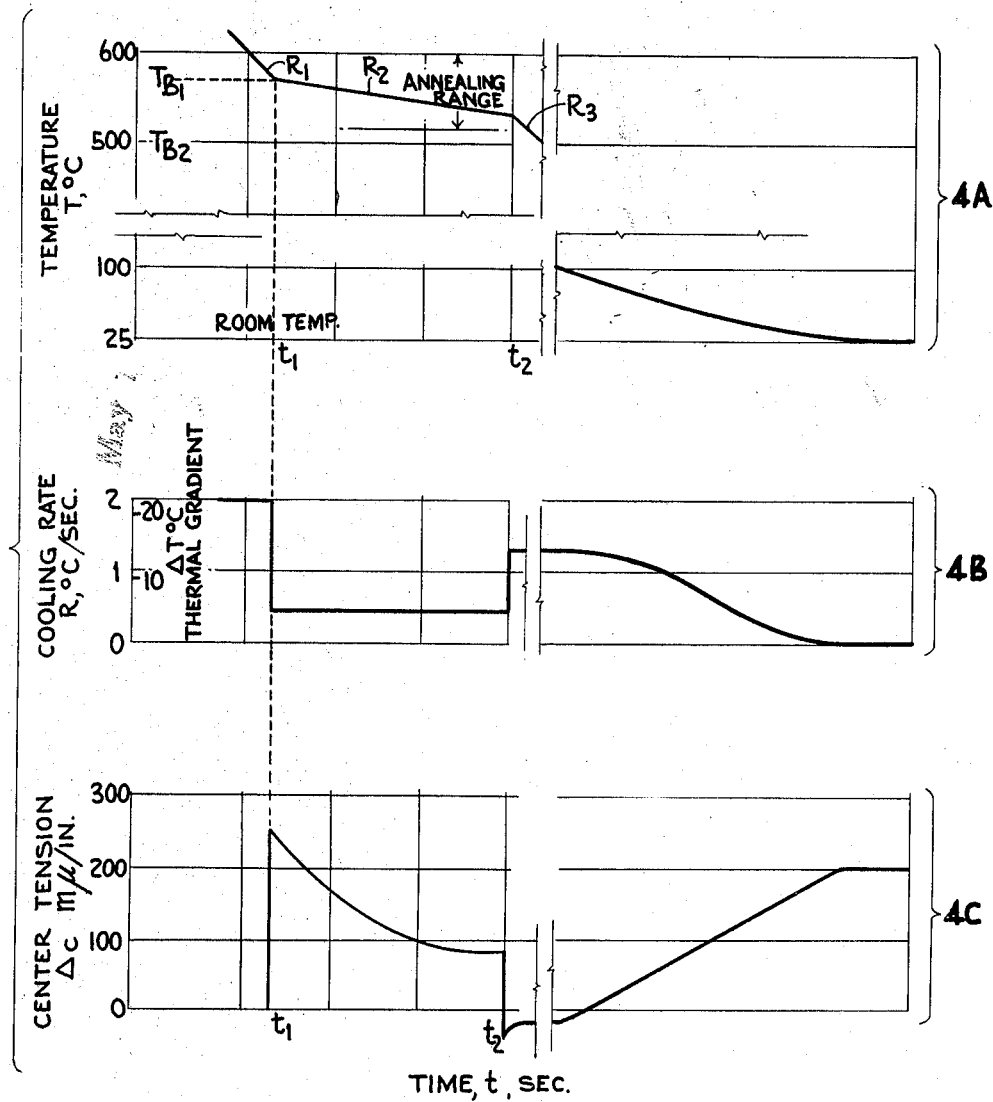

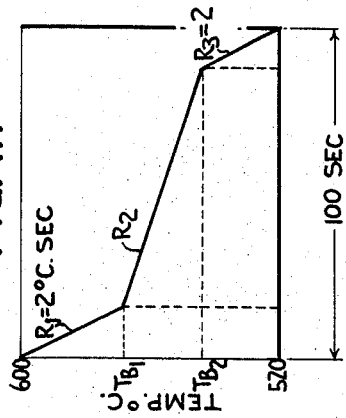
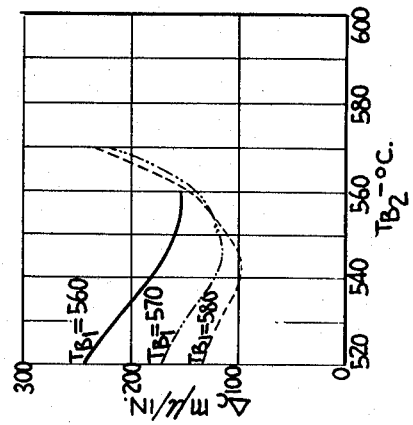
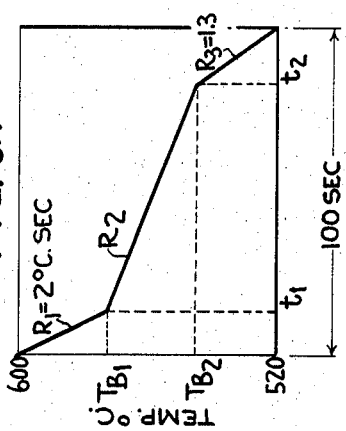
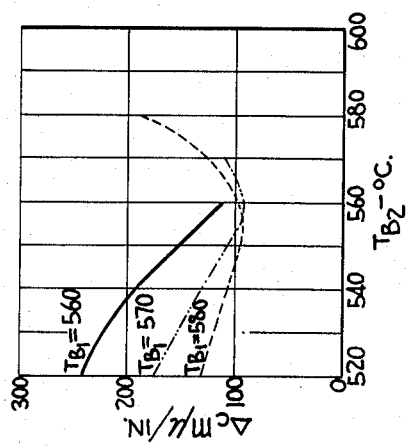
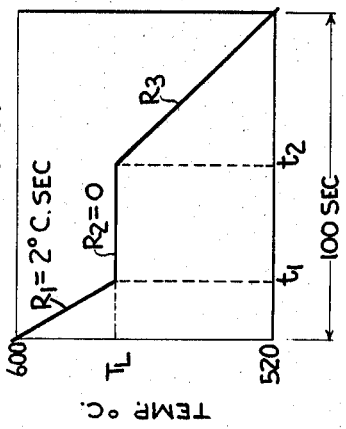
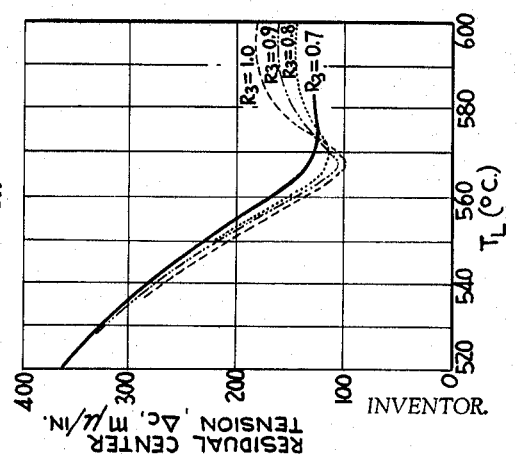

GENERALIZED STRESS RELAXATION CURVES
FOR SHEET GLASS USED IN ILLUSTRATIVE
CALCULATION

United States Patent Office 3,251,671
Patented May 17, 1966

3,251,671
METHOD OF ANNEALING OF GLASS RIBBON
Robert Gardon, Farmington, Mich., assignor to Pittsburgh Plate Glass Company, Pittsburgh, Pa., a corporation of Pennsylvania
Filed Feb. 5, 1962, Ser. No. 170,989
9 Claims. (Cl. 65—118)

This invention relates to the annealing of glass and especially to methods for cooling and annealing a continuous glass ribbon in an easily controlled manner and in a relatively short time while achieving relatively low levels of resultant stress in the finished products.

The necessity for applying a controlled cooling schedule to reduce the stress which appears in glass products as they are cooled from their molten form or from a temperature to which they were heated to relieve existing internal stresses is well recognized. In the production of a continuous glass sheet or ribbon, as by a drawing process, proper annealing is necessary to produce glass which has a substantially uniform over-all residual stress pattern and acceptable cutting characteristics. There is an optimum range of residual stress in sheet glass which renders the glass most suitable for cutting. High stress values tend to increase cutting difficulties by increasing the tendency of a running fracture to depart from a score line made by a cutting tool.

Broadly, the process of reduced residual stress involves the cooling of glass, formed from a molten source or heated to a temperature at which existing stresses relax, in a manner such that substantial residual stresses will not reappear when the glass temperature has reached equilibrium. To minimize stress, exact control of temperature is important only during a narrow temperature range—the annealing range. The upper limit of the annealing range is capable of practical definition and determination for a given glass. In general, it is the lowest temperature at which the relaxation of stresses is so rapid that stresses cannot be detected on the time scale of the process being considered. The lower limit of the annealing range is more indefinite but is generally taken as that temperature from which a piece of glass can be quickly cooled without introducing permanent stress. It must be recognized that the temperature limits of the annealing range for a given glass composition are not fixed but, rather, vary with the annealing time.

In accordance with this invention, it has been found that in annealing continuous glass sheet which is produced by the conventional drawing or forming processes where short annealing times (for example, of the order of 100 seconds) are available, the annealing range for a given glass is somewhat higher than that heretofore regarded to be valid.

Heretofore, to obtain the lowest residual stress with the greatest economy of time, an annealing procedure developed by Adams and Williamson* has been applied. This procedure consists of two essential steps: (1) holding or soaking the glass at a constant temperature high in the annealing range for a portion of the annealing time and then (2) cooling the glass from such a high constant temperature to the lower limit of the annealing range at a gradually increasing rate so as to introduce a final permissible stress during the remainder of the available annealing time. The success of this method is dependent upon an accurate computation of the initial annealing temperature selected and the cooling rate, and the cycles must be followed very closely. From a practical standpoint, it is difficult to apply this procedure to a continuous ribbon of glass of substantial width. It necessitates lowering the temperature of the ribbon from the forming temperature to the upper limit of the annealing range rapidly and uniformly, and then holding the temperature constant throughout the area being annealed for the proper length of time. Because of these difficulties in accurately following the prescribed theoretical curve of Adams and Williamson, industrial processes have generally only followed the annealing curve of Adams and Williamson approximately or have attempted to establish constant cooling rates through the annealing range. Such schedules generally involve a gradual cooling through the annealing range with a reduction in the cooling time above and below the critical range where the cooling process does not affect the residual stress.

U.S. Patents Nos. 2,774,190 and 2,952,097 are examples of the application of the theoretical annealing curve of Adams and Williamson to an industrial process of glass drawing. These patents indicate the necessity of maintaining a relatively high temperature of the glass for a substantial proportion of the annealing range and for accurately controlling the cooling curve through the annealing range.

The present invention, relating to a novel annealing schedule, has eliminated the necessity for maintaining the glass at a high constant temperature through a part of the annealing range and does not require cooling the glass through the annealing range at progressively increasing cooling rates, which are difficult to control and duplicate. At the same time, the minimum degree of anneal can be achieved, as compared with the known theoretical calculations of Adams and Williamson, consistent with the original stress conditions and the time available for annealing. This has now been made possible by the realization that a temperature gradient can be introduced in stress-free glass being cooled through the annealing range of the glass to establish actual stresses in the glass within the annealing range which, by relaxation through viscous flow, reduce the final stress appearing in the glass. For example, if a glass plate just produced from a melt and still at an elevated temperature is cooled and a temperature gradient impressed upon it, no stress will be produced because the glass is too fluid. If the glass is cooled through the annealing range with the temperature distribution remaining constant, no stress will be induced and hence none will relax; yet, when the temperature is allowed to equalize below the annealing range, the glass will be found to have a stress distribution proportional to the cooling rate. If, however, this same temperature distribution is used to establish an actual stress, as by rapidly changing the gradient within the annealing range, the stress established is capable, by relaxation through viscous flow of the glass, of reducing the final resultant stress in the glass at isothermal room temperature conditions. By computing the retained stress during intervals of relaxation until the temperature "breaks" again with a resulting instantaneous change in stress, or until the glass passes out of the annealing range below which stresses do not relax but change only as the temperature distribution changes, the final residual permanent stress in the glass may be calculated. This treatment of the relaxation of actual instantaneous stresses differs from the treatment of stress relaxation of Adams and Williamson which deals with the relaxation of what might be called potential stresses, i.e., stresses existing in the cold isothermal glass. This new treatment leads to a different method of annealing glass.

In this approach to annealing, then, which forms the basis of the present invention, the final permanent stress is considered a function of both the temperature distribution in the glass above the annealing range and the amount of relaxation of instantaneously existing stresses. Moreover, the relaxation of instantaneously existing ---
*L. H. Adams and E. D. Williamson, J. Franklin Inst., 190, 597–631 and 835–868 (1920).

stresses may or may not induce a final permanent stress in the glass, as will be shown. This treatment of stress relaxation does not contradict the well-known principle set forth by Adams and Williamson, but, rather provides a new method of calculation which allows the determination of new and equally effective annealing schedules for glass.

The present invention is concerned with methods for cooling glass in an easily controlled manner to produce minimum residual stresses in a given annealing time. This is accomplished through a novel annealing schedule. Broadly, this schedule comprises cooling the glass through the annealing range in a plurality of distinct cooling rates, each of which may be substantially constant for its duration. Preferably, the glass will be cooled rapidly from its forming temperature to a point within the annealing range, whereupon it will be cooled at a second diminished substantially linear cooling rate and thereafter, still within the annealing range, will be cooled at a third substantially constant but increased cooling rate to at least the lower limit of the annealing range. The time during which each change to a different cooling rate takes place must be extremely short relative to the time duration of the rates themselves. Alternative cooling schedules could include curves utilizing more than three distinct cooling rates. The preference for three cooling steps is based on practical engineering considerations.

Advantages attendant upon this process include the relative ease by which linear rates of cooling may be established and maintained or reproduced as compared with nonlinear rates, the low requirements of additional heat for controlling an annealing schedule in which the glass is continually cooled as compared with a schedule in which the glass must be maintained at an elevated temperature for a substantial portion of the available annealing time, and the reduction of the susceptibility of the glass to roll marking or other surface deformation by virtue of the preferred rapid lowering of the ribbon temperature during the initial stages of annealing.

Just as industrial applications of other annealing procedures have resulted in annealing schedules simplified from more ideal curves, it is possible to further simplify the preferred embodiment of the instant invention. It has been found that an acceptable anneal can be obtained using the teachings of this invention by utilizing only two cooling rates within the annealing range. Where the time available for annealing is determined, it has been found that certain combinations of two separate cooling rates within the annealing range produce a product having lower resultant stress than cooling at a single constant rate. The first of the two cooling rates will most advantageously be more rapid than the constant rate of cooling so as to reduce the susceptibility of the glass to marking from the drawing rolls during the initial stages of the drawing operation, thereafter changing to a diminished cooling rate intermediate the annealing range so that the temperature of the glass reaches the lower limit of the annealing range in the same time as the straight line schedule. Alternatively, the first cooling rate may be more gradual than the straight line rate, with a change intermediate the annealing range to a more rapid rate. In either case, a proper selection of the cooling rates and the temperature at which the change in the cooling rates is made will result in a final product having less residual stress than if cooled at a constant rate through the same temperature range in the same time.

Other attendant advantages of this invention will be more readily appreciated as the same becomes better understood by reference to the following detailed description when considered in connection with the accompanying drawings in which:

FIG. 4 shows a series of three graphs for a preferred cooling schedule of the present invention in which the temperature (FIG. 4A), the cooling rate and the thermal gradient (FIG. 4B) and the center tension (FIG. 4C) are plotted on a common time scale.

FIGS. 5, 6 and 7 each show a temperature vs. time curve for a specific example of an annealing schedule (FIGS. 5A, 6A and 7A) and a family of curves indicating the residual stresses produced by the annealing schedules (FIGS. 5B, 6B and 7B).

Figure 8:
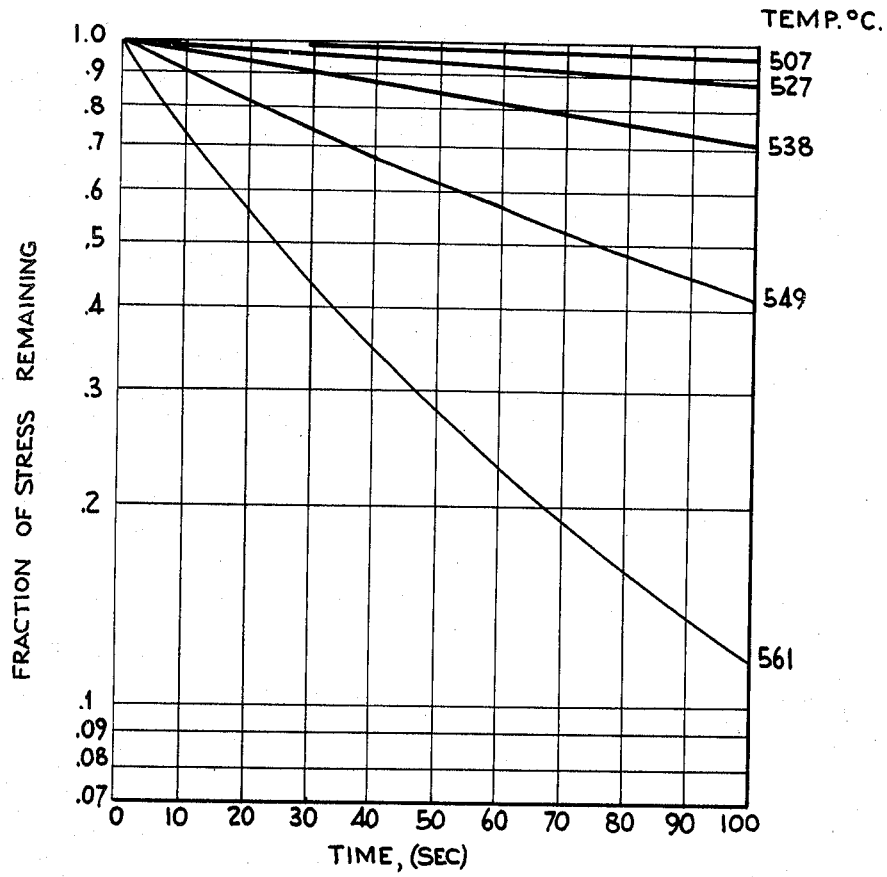

FIG. 8 is a graph showing an example of the stress relaxation curves used in the method of calculation disclosed herein. These curves were derived from the data for the stress relaxation of a particular glass composition, as disclosed by A. F. Van Zee and H. M. Noritake, "Measurement of Stress Optical Coefficient and Rate of Stress Release in Commercial Soda-Lime Glasses," J. Am. Ceram. Soc., 41, 164–175, 1958.

Figure 9:
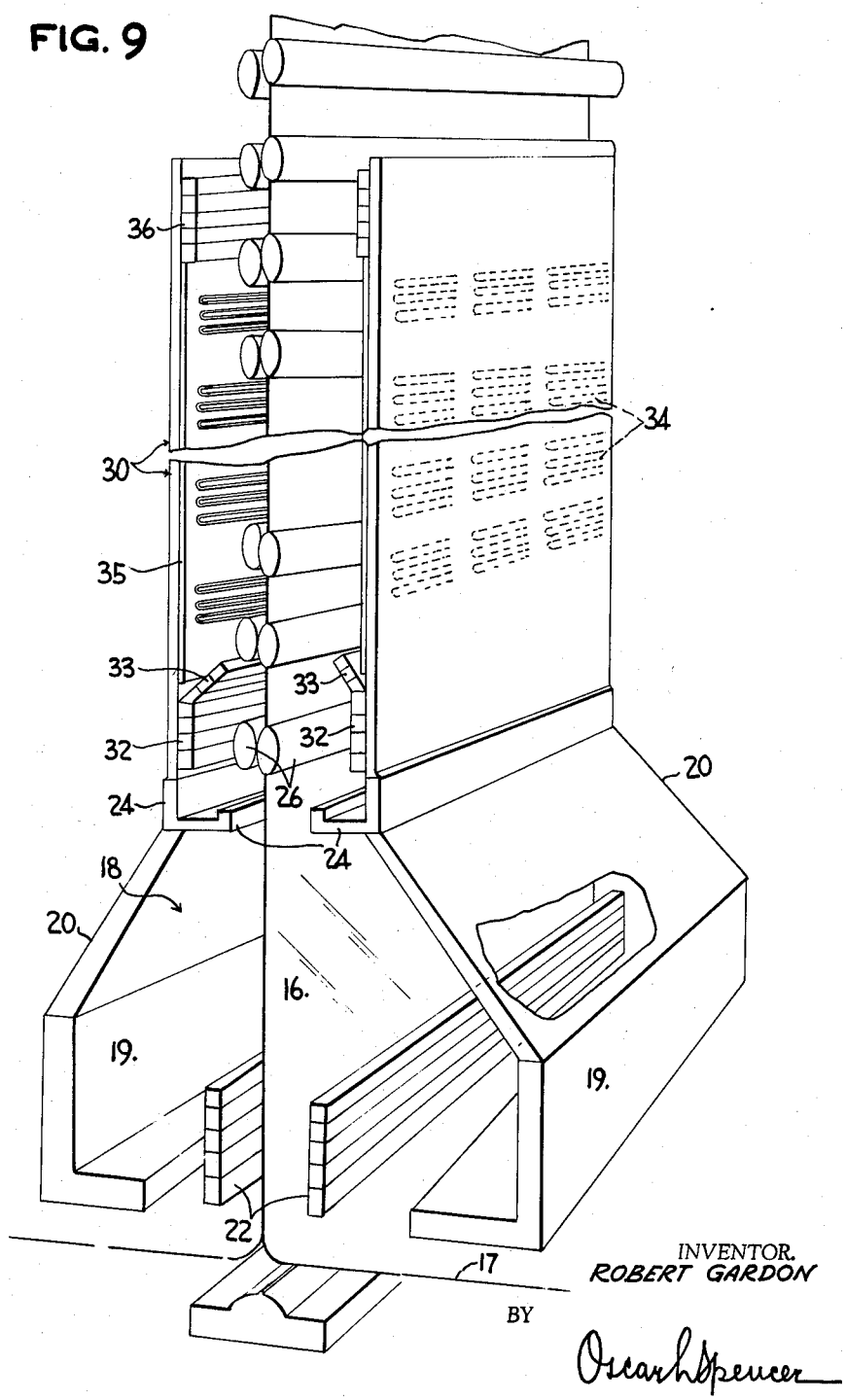

FIG. 9 is a schematic, perspective view of a glass drawing machine illustrating a preferred embodiment of the invention.

Figure 10:
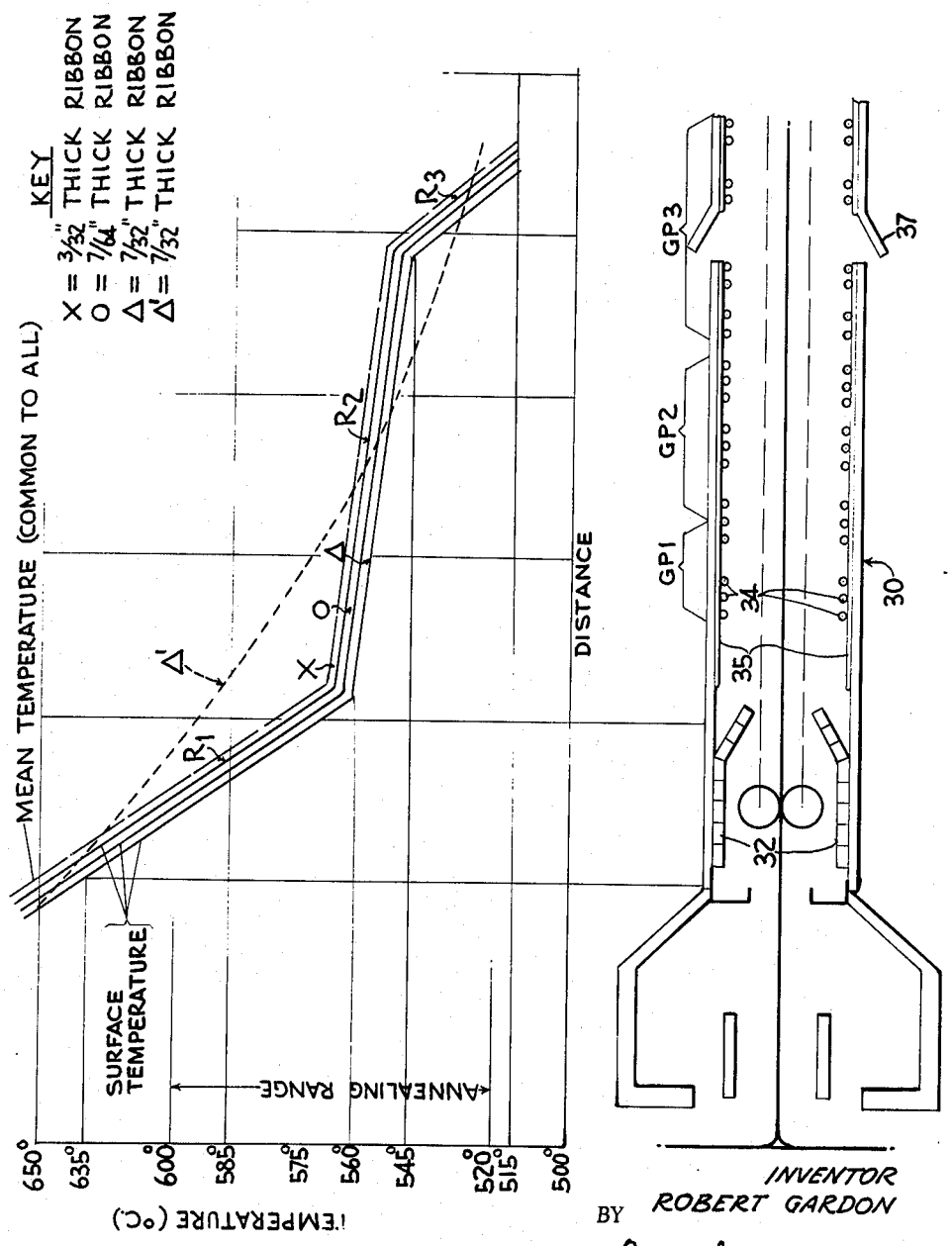

FIG. 10 is a chart showing preferred cooling curves for vertically drawn sheet glass wherein the surface temperatures of different thicknesses of glass ribbons having identical mean temperatures are compared with their vertical positions in a schematically shown vertically disposed lehr during the upward travel of each ribbon.

Figure 11:
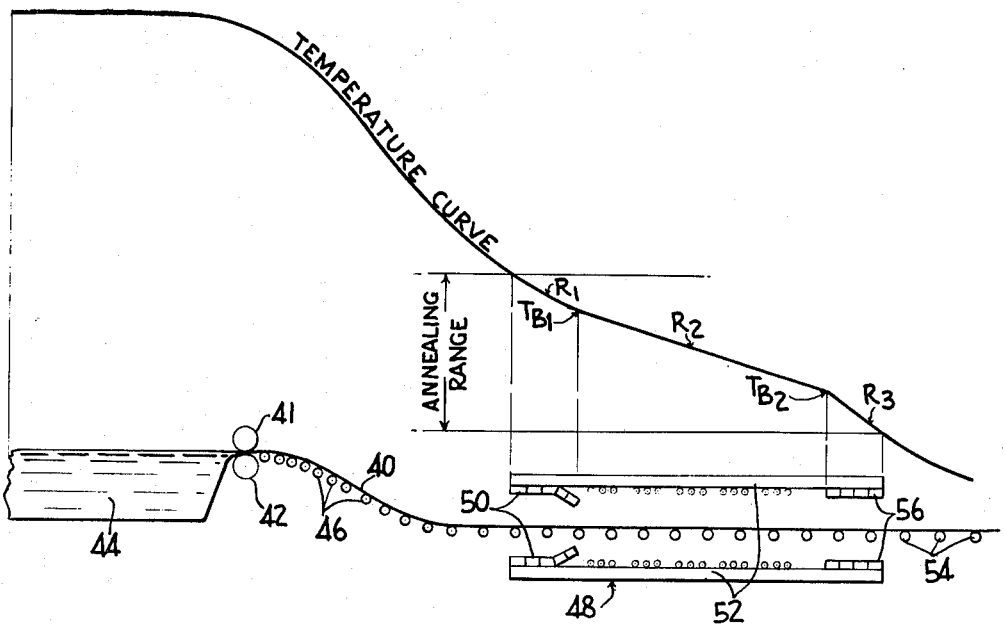

FIG. 11 is a chart showing a preferred cooling curve for horizontally rolled glass wherein the temperature of glass ribbon is compared with its horizontal position in a schematically shown horizontally disposed lehr during the travel of the ribbon.

Figure 12:
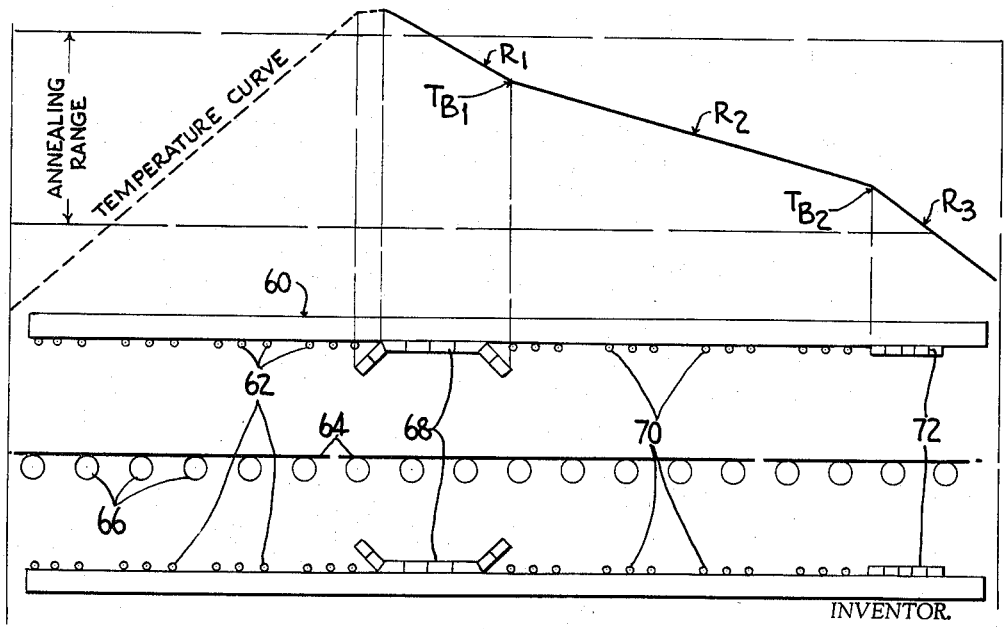

FIG. 12 is a chart showing a preferred cooling curve for reannealing glass sheets or plates, either flat or curved, wherein the temperature of the glass is compared with its position in a schematically shown horizontally disposed lehr during the travel of the glass.

Figure 1:
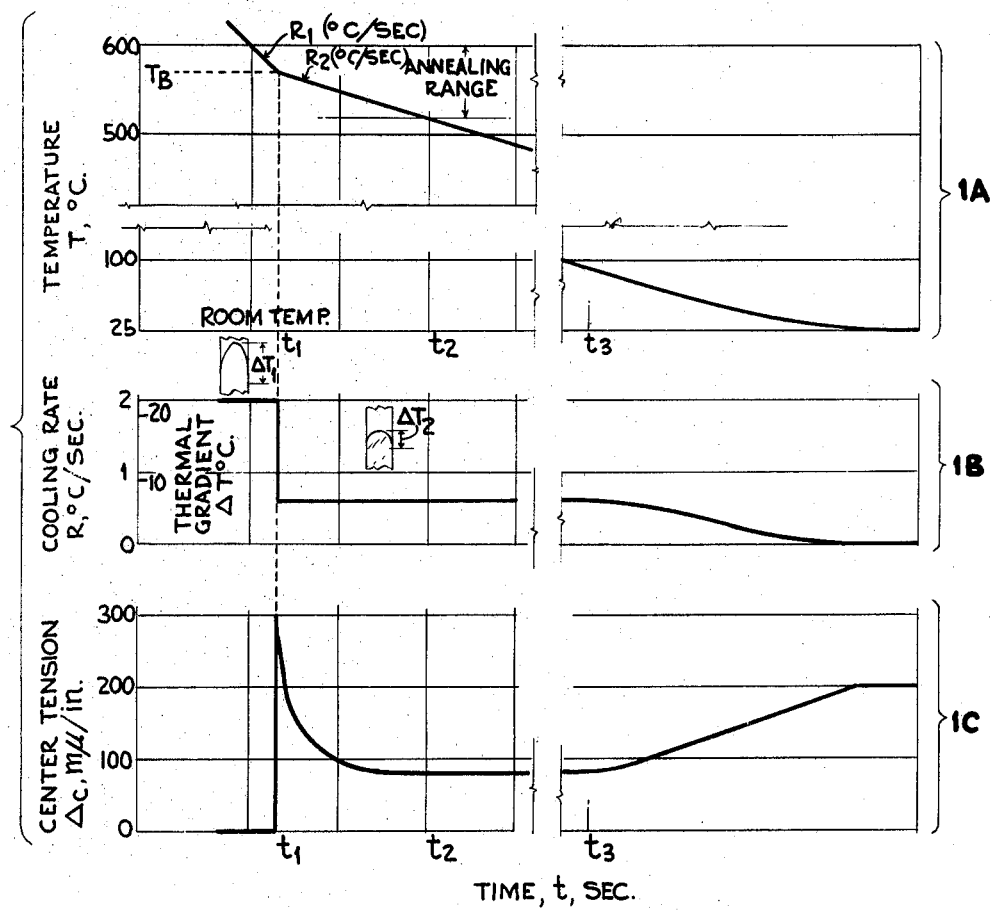
FIG. 1 shows a series of three graphs for a cooling schedule of the present invention in which the temperature (FIG. 1A), the cooling rate and the thermal gradient (FIG. 1B), and the center tension (FIG. 1C) are plotted on a common time scale.
Figure 2:
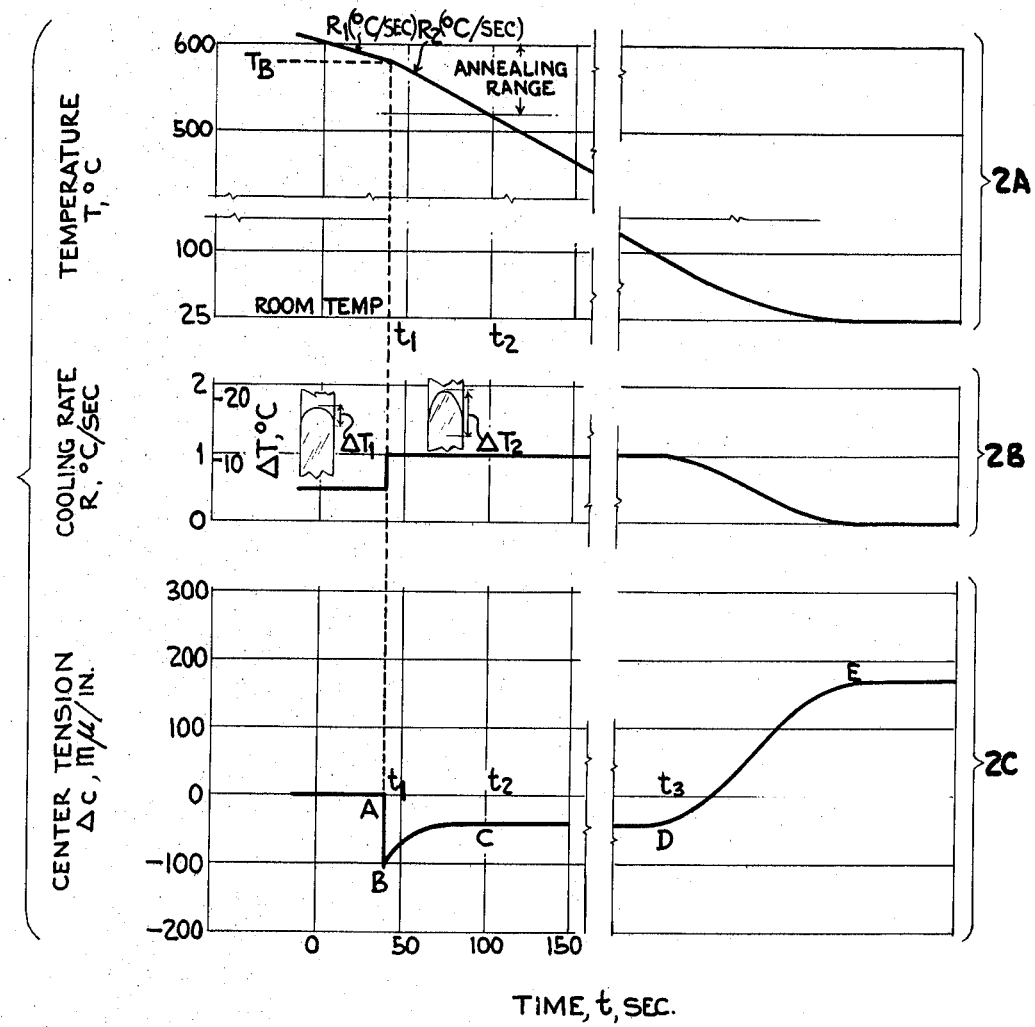
FIG. 2 shows a series of three graphs for a second cooling schedule of the present invention in which the temperature (FIG. 2A), the cooling rate and the thermal gradient (FIG. 2B) and the center tension (FIG. 2C) are plotted on a common time scale.

An understanding of the theory upon which the present invention is based may be best obtained by following two annealing schedules, as shown in FIGS. 1 and 2, respectively, of the drawings, which focus attention on the two principal mechanisms involved: (1) the origin of stresses in glass by rapid changes in temperature distribution and (2) the relaxation of stresses by viscous flow. In developing these theoretical concepts, the fact that the corresponding intrinsic rates of stress release differ in various parts of a glass sheet which are at different temperatures has been neglected. For example, as glass approaches the lower limit of the annealing range, its surface layers may have been cooled below this limit while the central parts are still capable of viscous flow. Considerations of differences thus created have been neglected in this simplified treatment.

The two schedules indicate that the relaxation of instantaneous stresses may either help or hinder the attainment of a low final permanent stress, and that there is an optimum schedule to produce the least permanent stress.

FIG. 1 is composed of three graphs, 1A in which the temperature of a glass sheet undergoing a cooling process is plotted against time, 1B in which the cooling rate $R$ and the thermal gradient $\Delta T$ between the center and the surfaces of the glass sheet are plotted against time, and 1C in which the instantaneously existing stress in the glass in terms of center tension expressed in central birefringence $\Delta_c$ is plotted against time. Because the time scale of the annealing processes discussed herein is of a magnitude that—except for a very short transition period following changes in cooling rate—the temperature distributions within the glass may be considered in their quasiequilibrium state, i.e., parabolically distributed. The stress distributions, therefore, will also be parabolically distributed and can be conveniently characterized by a single parameter such as the instantaneously existing center tension.

A cooling gradient applied to the glass sheet above the annealing range of the glass cannot produce a stress in the glass because any stress would, due to the low viscosity of the glass, instantaneously relax through viscous flow; and that no stress will be produced as the glass is cooled at a constant rate (which corresponds to a constant thermal gradient as may be seen by correlating the curves of FIGS. 1A and 1B), it will be evident that there will be no stress produced in the glass until the rate of cooling is changed at some point below the upper limit of the annealing range. As shown in FIG. 1A, a glass sheet is cooled at a first rate $R_1$ from above the annealing range to a temperature $T_B$ within the annealing range. FIG. 1C indicates that the glass being cooled at rate $R_1$ by the thermal gradient $\Delta T$ in FIG 1B is stress free. If the constant cooling curve is changed to a second constant cooling rate $R_2$ at a point within the annealing range, as illustrated at point $T_B$ in FIG. 1A, an instantaneous stress proportional to the change in cooling rates is also produced. Regarding the relatively rapid change in temperature distribution at time $t_1$ in FIG. 1A as instantaneous, the dominant response of the glass is likely to be an elastic one. Thus, the sudden diminution of $\Delta T$ (the temperature difference between the surface and mid-plane of the plate as indicated by the inserts in FIG. 1B diagrammatically showing the temperature distribution through the plate thickness) is expected to produce an instantaneous increase in center tension. See FIG. 1C. If the glass were elastic, the stress induced would remain constant as long as the temperature distribution in the glass did not again change. However, because the glass, when at a temperature within the annealing range, is not elastic, it physically adjusts through viscous flow to relax the instantaneously induced stress. The relaxation occurs at a diminishing rate because the absolute level of stress and the temperature of the glass are decreasing. Relaxation continues, as shown in FIG. 1C, until the temperature of the glass reaches the lower limit of the annealing range. From the lower limit of the annealing range to room temperature the glass is essentially an elastic material and the permanent stress is not changed by that portion of the cooling schedule between $t_2$ and $t_3$. As the temperature of the glass approaches room temperature, the cooling rate which was constant is diminished as is, therefore, the temperature difference between the surface and mid-plane of the glass. Because the glass is now an elastic material, this decrease in $\Delta T$ from time $t_3$ results in an increase in stress which is one component of the final permanent stress produced in the glass by the thermal history. This stress is equivalent to the stress which would have been produced by maintaining a constant cooling rate corresponding to the terminal rate $R_2$ through the annealing range plus the unrelaxed stress from the change in cooling rates within this annealing range. It is also equivalent to the stress which would have resulted from continuing the first cooling rate through the annealing range, less the amount of the stress caused by the change in cooling rates which relaxes.

The final permanet stress could, of course, be diminished by decreasing the terminal cooling rate $R_2$. However, this would take more time for annealing. The final permanent stress could also be diminished by increasing the amount of stress which relaxes, as by lengthening the time interval $t_1$–$t_2$ between the change in the cooling rate and the time at which the temperature of the glass reaches the lower limit of the annealing range. Because the time available for annealing is often limited in an industrial process, there exists within the available time an optimum combination of the temperature at which the cooling rate is changed and either the rate to which it is changed, or the time interval $t_1$–$t_2$ between the change in the cooling rate and the time at which the glass reaches the lower limit of the annealing range. The graph of FIG. 1C shows that the relaxation of the instantaneously induced stress caused by the change in cooling rates decreases the center tension and thus the final stress in the glass.

As the cooling schedule and stress curve in the graphs of FIG. 2 indicate, the relaxation of temporary stresses does not necessarily diminish the final permanent stress. FIG. 2A shows a cooling schedule in which the glass is cooled from above the annealing range to a temperature $T_B$ within the annealing range, and at time $t_1$ is cooled at an increased rate through the annealing range to room temperature where the glass becomes isothermal. In this case, the change in cooling rates produces an increase in the temperature difference between the mid-plane and the surface, as shown by the graph and schematic inserts in FIG. 2B. The corresponding elastic response of the glass is for the center of the sheet to be put in compression, as is indicated by the line AB in FIG. 2C. This stress relaxes as in the previous example until the temperature of the glass passes through the lower limit of the annealing range at time $t_2$, after which the stress remains constant until the gradual disappearance of the temperature gradient brings the glass to its final stress condition. In this case, the relaxation of stress from time $t_1$ to time $t_2$ is in the positive direction, i.e., in the direction of increased center tension, and it therefore tends to increase the residual stress. While it would appear to be desirable to suppress this stress relaxation, as by increasing the terminal cooling rate so as to diminish the time available for stress relaxation, the establishment of an increased rate would increase the step in stress from D to E (which is proportional to the terminal cooling rate) and would offset the gain due to the reduction of stress release between B and C. Once again, for any externally imposed conditions there will exist an optimum combination of the break temperature, i.e., the temperature at which the rate of cooling is changed, and the terminal cooling rate that will produce the least amount of final permanent stress.

Figure 3A:
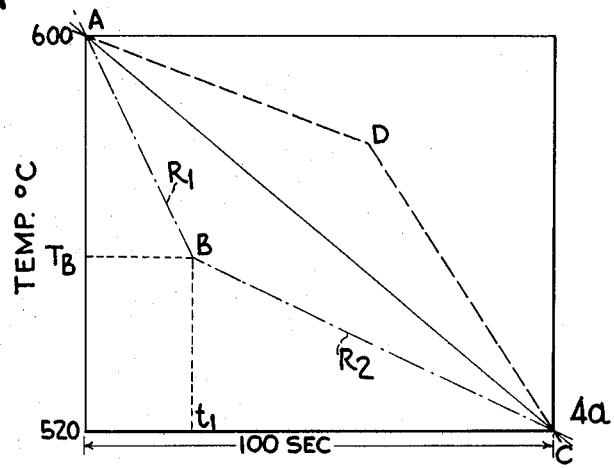
FIG. 3 shows temperature-time curves which traverse the annealing range within a specified time (FIG. 3A) and the residual center tension resulting from following such representative curves (FIG. 3B).
Figure 3B:
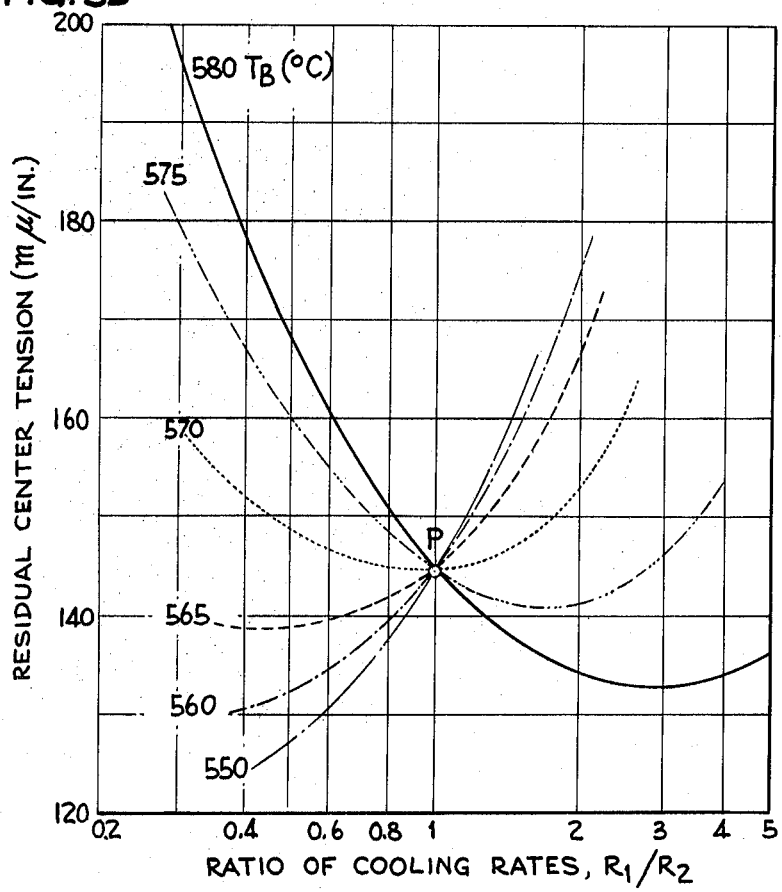

A specific example of the application of the above principles to the annealing process used for drawing a continuous ribbon of glass is illustrated in the graphs of FIGS. 3A and 3B, as applicable to glass of 7/32-inch thickness, the annealing taking place within the short periods of time herein contemplated. The speed of draw, which is determined by factors relating to the phenomenon of ribbon formation and desired thickness, governs the time in which the glass will pass through the annealing lehr of the drawing machine. Such factors as the susceptibility of hot glass to marking and deformation by the drawing rolls, and the necessity for lowering the temperature of the glass to about 90 degrees centigrade by the time it reaches a cut-off station where it must be cut and handled, make it desirable to lower the temperature of the glass through the annealing range at an early stage after its formation. The specific distance during which the glass is annealed in the drawing machine is arbitrarily established, consistent with the above-mentioned manufacturing factors and the degree of anneal which can be attained during the time it takes the glass to traverse any established distance. It happens that, once a distance zone of the machine is established for annealing, it is possible to anneal within that zone all the different thicknesses of glass drawn by the machine. This is possible, notwithstanding the different drawing speeds (and therefore different times within the annealing range) required for the different thicknesses of glass, because thinner ribbons of glass which are drawn more rapidly than thicker ribbons also cool more rapidly. This characteristic is graphically illustrated by the curves in FIG. 10 of the drawings.

In the description of the annealing schedules included herein, all temperatures, unless otherwise specified, refer to the mean temperature of the glass. Because the present annealing schedules are primarily applicable to what is known in the industry as "flat glass," i.e., glass sheets, plates and other glass products having essentially parallel major surfaces and including bent or curved sheets or plates, the temperature at the surface or mid-plane of the glass, as well as the mean temperature, could be used in specifying the annealing schedules.

Temperature limits of annealing ranges, as specified herein, are capable of practical determination by comparing stress in a glass sample cooled at a constant cooling rate through a temperature range which clearly encompasses the annealing range, with the stress in various samples cooled at two cooling rates, one of which is the same as the constant cooling rate of the first sample. As long as the change in cooling rates occurs above or below the limits of the annealing range and the constant cooling rate equivalent to that of the first sample is maintained through the annealing range, the resultant stress will remain the same. Once the change in temperature occurs within the annealing range, the resultant stress will change because the cooling schedule through the annealing range will no longer be a single constant rate. Hence, if the temperature at which the cooling rates are changed is varied, the limits of the annealing range will manifest themselves by a change in resultant stress because of the appearance of the break temperature within that temperature range which affects the final stress. In general, the annealing range of typical soda-lime-silica window and plate glass for annealing schedules of a time magnitude contemplated in the examples set forth herein (i.e., on the order of 100 seconds for $\frac{7}{32}$-inch thick glass) is approximately 600 to 520 degrees centigrade. This refers to the mean temperature of the glass. For purposes of control it is convenient to determine this mean temperature from measurement of surface temperature which will be invariably lower. For example, for $\frac{7}{32}$-inch thick glass, the surface temperature, while the glass is in the annealing range, will extend from about 585 to 505 degrees centigrade. For any thickness of glass, the surface temperature observed while the glass is within the annealing range would vary as indicated by the above equation, and remains roughly in the range of 600 to 500 degrees centigrade. Variations in the composition of the glass can, of course, raise or lower the annealing range.

The determination of stress values expressed herein is based on a comparison of the path difference formed between two plane-polarized light waves passing through stressed glass, as determined by a known standard procedure.

Taking as an illustrative example, the production of a standard $\frac{7}{32}$-inch thick continuous ribbon of glass, manufacturing considerations as discussed above have imposed the requirement of lowering the temperature of the glass from 600 to 520 degrees centigrade (the annealing range) in 100 seconds. The simplest possible cooling schedule is that corresponding to cooling at a uniform rate throughout the annealing range. With the above conditions set for the present example, straight-line cooling permits no variations and corresponds to cooling the glass at a uniform rate of 0.8 degrees centigrade per second. The corresponding stress (center tension) produced in $\frac{7}{32}$-inch thick sheet glass is about 145 millimicrons per inch.

A system having a single break in the cooling schedule, as shown by the dotted lines in FIG. 3A, permits some variation in the annealing process. This may range from a high initial cooling rate and a low terminal rate, as indicated by curve ABC, through a constant cooling rate AC, to a low initial rate and high terminal rate, as indicated by curve ADC. The break may occur at any temperature $T_B$ within the annealing range. In addition to the break temperature $T_B$, a single break cooling schedule passing from the upper limit to the lower limit of the annealing range in the specified time of anneal can be characterized by one additional independent variable, the initial rate of cooling $R_1$ or the terminal rate of cooling $R_2$, or the ratio of these two. There is shown in FIG. 3B a plot of the residual stresses produced in $\frac{7}{32}$-inch thick glass as a function of the break temperature $T_B$ and the ratio of the initial and terminal cooling rates for single break annealing schedules in which the glass is cooled from 600 to 526 degrees centigrade in 100 seconds. All of these curves pass through point $p$, which corresponds to cooling without a break and a terminal stress of 145 millimicrons per inch. With the break occurring at 570 degrees centigrade, it may be seen that the lowest obtainable degree of stress occurs where the ratio of cooling rates is equal to 1, i.e., the condition of no break at all. For breaks occurring at temperatures below 570 degrees centigrade, decreasing the ratio of the initial cooling rate to the terminal cooling rate produces a lower residual stress, while increasing the ratio increases the residual stress. On the other hand, when the break occurs at temperatures higher than 570 degrees centigrade, lower terminal stresses are produced where the initial cooling rate is greater than the terminal cooling rate. Break temperatures which occur higher than 570 degrees centigrade have very well defined minima showing that, for any given break temperature, there is an optimum ratio of initial to terminal cooling rates beyond which the ratio should not be increased. This optimum arises from a balance between a decreased contribution to the permanent stress from the decay of the temperature gradient corresponding to a smaller terminal cooling rate $R_2$, and an increased contribution to the final permanent stress from the higher instantaneous stress induced at the time at which the change in cooling rates is made as a result of a more drastic change of cooling rates from initial to terminal, which clearly has not time to decay sufficiently before the glass is cooled below the annealing range.

Turning now to FIG. 4 of the drawings, the general cooling schedule of a more complicated two-break temperature curve is shown in FIG. 4A plotted against time. The accompanying changes in the thermal gradient and center tension are shown on the same time scale in FIGS. 4B and 4C, respectively. The center tension created by the first change in cooling rates from $R_1$ to $R_2$ at time $t_1$ relaxes in a direction which decreases the ultimate center tension. In addition, the gradual slope of the temperature curve $R_2$ (FIG. 4A) during the second cooling rate indicates a low thermal gradient (see FIG. 4B) which, if continued through the annealing range, would result in a relatively low final permanent stress. However, if this rate were continued, the lower limit of the annealing range would not be reached in the required time. Therefore, a second break at time $t_2$ and a third more rapid cooling rate $R_3$ are established to lower the temperature of the glass below the annealing range in the required time. As the curve in FIG. 4C shows, this change causes an instantaneous stress in the direction of increased center compression. Any relaxation of this stress is therefore harmful because it decreases the center compression (i.e., increases center tension). However, because the temperature of the glass at this point is near the lower limit of the annealing range, there is very little actual relaxation and the glass does not, to any great degree, physically adjust through viscous flow to the third cooling rate. Therefore, the final permanent stress when the third gradient is removed will not be proportional to this high gradient. Rather, it will be proportional to the stress which would result from the removal of the initial cooling gradient, less the portion of the instantaneous stress produced by the first change in cooling rates that relaxes during the second cooling rate, plus the portion of the instantaneous stress produced by the second change in cooling rates that relaxes during the third cooling rate.

FIGS. 5, 6 and 7 illustrate specific examples of the more complicated cooling schedules entailing two breaks, still conforming to the requirement of cooling the $\frac{7}{32}$-inch thick sheet of glass from 600 to 520 degrees centigrade in 100 seconds.

FIG. 5A illustrates an annealing schedule in which the temperature of the glass is lowered from above the annealing range at an initial cooling rate $R_1$ to a temperature level $T_L$ within the annealing range and held constant ($R_2=0$) between times $t_1$ and $t_2$, after which the glass is cooled at terminal cooling rate $R_3$. Residual center tension is plotted in FIG. 5B as a function of the three independent variables $R_1$, $R_3$, and $T_L$. The family of curves illustrated shows the variation in residual center tension for various terminal cooling rates and different temperature levels of the holding period when the initial cooling rate $R_1$ is equal to 2 degrees centigrade per second. These curves would, of course, vary with different initial cooling rates. It may be seen that the residual stresses depend strongly on the temperature level $T_L$ and to a somewhat lesser extent on the terminal cooling rate $R_3$. For all but the slowest cooling rates, for which the holding period is necessarily very short, the least degree of residual center tension is produced when the holding temperature is about 568 degrees centigrade. The lowest minimum produced under this annealing schedule, 98 millimicrons per inch, corresponds to the most critical cooling schedule, as indicated by the steepness of the graph on either side of the minimum. Similar families of curves (not shown) obtained for other values of the initial cooling rate $R_1$ also exhibit minima in the region of 100 to 120 millimicrons per inch for holding temperatures between 565 and 575 degrees centigrade.

FIGS. 6A and 7A illustrate examples of linear cooling schedules which entail two breaks at two different temperatures, $T_{B_1}$ and $T_{B_2}$, thus eliminating the constant holding temperature of the previous case. Cooling schedules of this type are characterized by four independent variables, such as the two break temperatures and either the corresponding break times $t_1$ and $t_2$ or two of the three cooling rates, $R_1$, $R_2$, $R_3$. FIGS. 6B and 7B are plots of residual stress as a function of the break temperatures $T_{B_1}$ and $T_{B_2}$ for initial cooling rates of 2 degrees centigrade per second and terminal cooling rates of 1.3 and 2 degrees centigrade per second, respectively. Several of these schedules, for example those corresponding to an initial cooling rate $R_2$ of 2 degrees centigrade per second and a first break temperature of $T_{B_1}$ between 570 and 580 degrees centigrade, give terminal stresses in the range of 94 millimicrons per inch, which are even lower than those considered optimum in schedules that entail holding at a constant temperature during the annealing schedule, as in FIG. 5A. Practically speaking, the decrease in calculated residual stresses from about 98 to 94 millimicrons per inch is less significant than the fact that these curves have more flat minima than those of FIG. 5B. This suggests that operation of the latter heat treating schedules at their optimum would be less critical than operation of the best schedule entailing holding at a constant temperature.

Reference is now made to FIG. 9 which shows an apparatus for drawing a continuous ribbon of glass 16 from a molten bath 17. As in conventional drawing apparatus, a drawing chamber 18 formed in part by L-blocks 19, ventilator water coolers 20, and cooled catch-pans 24 encloses an area above the bath and provides a suitable environment for the formation of the ribbon. Heat exchangers, such as coolers 22, hasten the solidification or "setting" of the glass as the ribbon is drawn from the bath 17 by a series of pairs of drawing rolls 26 and conveyed to a cutting station (not shown) several floors above the bath. The molten glass forming the bath 17 is maintained at a temperature of about 1000 degrees centigrade, which is suitable for the drawing process. As the ribbon is formed and drawn through the drawing chamber and into the annealing lehr 30, which encloses that portion of the ribbon that is within the temperature limits of the annealing range, it is first cooled from the high temperature of the bath by coolers 22, the ambient air within the drawing chamber 18, and the cooled catch pans 24. In this manner, the glass is cooled to a temperature of about 650 degrees centigrade by the time it leaves the drawing chamber. This much of the cooling cycle takes place above the upper temperature limit of the annealing range of the glass and is common to known processes and the process of the present invention.

FIG. 10 schematically indicates the surface temperatures of ribbons of different thicknesses and having identical mean temperatures relative to their positions in the drawing machine. The dotted-line curve indicates the temperature distribution of a glass ribbon drawn in the known manner wherein the ribbon cools at a natural rate characteristic of the drawing machine. A glass ribbon allowed to cool in such a substantially uncontrolled manner has been found to have an unacceptable level of residual permanent stress and, as a result, the glass is difficult to cut. Any loss of glass through breakage in cutting operations is, of course, undesirable, and for this reason it is particularly important that an effective cooling schedule be established that is compatible with existing manufacturing processes.

Easily controlled cooling curves of the type shown in FIG. 10 by the solid lines, based upon the principles explained above, have resulted in a reduction of residual stress in drawn glass to a level heretofore thought possible only by following a theoretical annealing curve of the type proposed by Adams and Williamson. This has been accomplished by establishing a large initial thermal gradient in the glass ribbon as it exists from the drawing chamber so as to rapidly cool the ribbon along the initial cooling rate $R_1$ greater than the natural rate of cooling from a temperature above the upper limit of the annealing range to a temperature within the annealing range. This may be accomplished in the manner shown in FIGS. 9 and 10 by positioning heat exchangers, such as water coolers 32, on each side of the ribbon at the entrance of the annealing lehr. These coolers are, in part, substantially parallel to and extend the width of the ribbon transversely of the direction of draw. They extend in the direction of the draw a sufficient distance to lower the temperature of the glass to the proper break temperature at the proper time, as optimized for the annealing time of the particular process. This distance, while substantially the same for different glass thicknesses drawn on the particular machine, as indicated by the temperature curves of the different ribbon thicknesses in FIG. 10, will vary with different types of drawing machines and with different arbitrarily selected annealing distances in the machines. Preferably, the terminal portion 33 of the coolers are inclined toward the ribbon to prevent the adjacent heating elements 34 from influencing those portions of the ribbon still adjacent the coolers.

When the ribbon passes the coolers 32, its rate of cooling is influenced by the heating elements 34 and the enclosure 30 which retard the normal cooling rate (shown in dotted lines in FIG. 10) to the diminished, substantially constant rate $R_2$. Of course, from a manufacturing standpoint, a linear rate $R_2$ is advantageous as it is more easily established and reproduced than non-linear cooling rates. However, slight variations in the linearity of this rate due to the varying locations of machine elements or other causes, such as errors or inaccuracy in control, will generally not adversely affect the resultant anneal to an unacceptable extend.

Positioned at the upper or exit portion of the lehr in FIG. 9 are coolers 36 on each side of the ribbon. These coolers are substantially parallel to the ribbon and extend the width thereof transversely of the direction of draw. In this manner, the desirable accelerated final rate of cooling of the glass may be established to lower the temperature from a point within the annealing range to a temperature below the annealing range. Alternatively, as shown in FIG. 10, doors 37 in the sides of the machine may be opened at this point to obtain an increase in the cooling rate. While these coolers or openings are used to establish the preferred curves of the type shown in the graph of FIG. 10, an acceptable anneal may be established by omitting the cooling at this point and establishing only a single break in the annealing curve.

The following is an example, by way of illustration only, of a preferred mode of manufacturing sheet glass utilizing the present invention to obtain a low resultant stress in the final product:

A ribbon of glass approximately 100 inches wide and 7/32-inch thick is continuously formed by being mechanically drawn from a partially enclosed bath of molten glass maintained at a temperature of approximately 1000 degrees centigrade and consisting of:

|  | Percent by weight |
|---|---|
| $SiO_2$ | 71.38 |
| $Na_2O$ | 12.79 |
| $CaO$ | 9.67 |
| $MgO$ | 4.33 |
| $Na_2SO_4$ | 0.75 |
| $NaCl$ | 0.12 |
| $Fe_2O_3$ | 0.15 |
| $Al_2O_3$ | 0.81 |

The ribbon, formed and drawn upwardly by the traction of pairs of opposed drawing rolls acting upon the already formed portion of the ribbon, first passes between a pair of vertically disposed heat exchangers within the drawing chamber which remove heat from the ribbon and drawing chamber at a rate of approximately 8640 British thermal units per minute. In addition, the ventilator coolers, in part forming the drawing chamber, remove heat from the ribbon and drawing chamber at a rate of 1970 British thermal units per minute. As the ribbon travels upwardly and the portion thereof being considered leaves the drawing chamber, catch-pan coolers on each side of the ribbon at the exit end of the drawing chamber remove heat from the ribbon and drawing chamber at the rate of 12,600 British thermal units per minute. In this manner, the temperature of the glass ribbon is reduced to approximately 635 degrees centigradte surface temperature as it leaves the drawing chamber. Another pair of coolers, one cooler on each side of the ribbon, located just above the drawing chamber and within the enclosed portion of the drawing machine, withdraw heat from the ribbon at a rate of 1085 British thermal units per minute to lower the temperature of the ribbon at a substantially constant and increased rate over the natural cooling rate from 635 to 560 degrees centigrade measured surface temperature in approximately 45 seconds from the time the ribbon enters the enclosed portion of the machine above the drawing chamber. For the next approximately 65 seconds, the natural cooling rate of the ribbon is retarded by insulation and heating elements positioned within the enclosed portion of the drawing machine, and in this time the ribbon is cooled to a temperature of approximately 545 degrees centigrade measured surface temperature. For this purpose, the heating elements are divided into three vertical zones, as indicated in FIG. 10 of the drawings. Electrical power is distributed in the amounts of 400 watts to the first zone, 300 watts to the second, and 200 watts to the third to retard the cooling rate of the ribbon. In the next approximately 20 seconds, the cooling rate of the ribbon is increased above the natural cooling rate by opening the sides of the machine so as to lower the temperature of the ribbon to approximately 515 degrees centigrade measured surface temperature. It should be pointed out at this time that the annealing range of the glass, in terms of mean temperature, is, in this example, taken to be about 600 to 520 degrees centigrade. This corresponds to a range in terms of the surface temperature of the glass of about 585 to 515 degrees centigrade. The ribbon is cooled through the annealing range in approximately 100 seconds. The ribbon is then cooled at a natural rate and is at a temperature of approximately 90 degrees centigrade when it reaches the cut off floor where the ribbon is cut into discrete sheets. The central birefrigence of a 7/32-inch thick glass sheet annealed in this manner, as indicated by the path difference formed between two plane-polarized light waves passing through the glass measured in the manner previously explained, is approximately 110 to 120 millimicrons per inch. As would be expected, calculated stress minima will generally only be approached rather than reached in actual operations. By way of comparison, similar ribbons of glass drawn through the same machine but allowed to cool naturally (i.e., without the use of the water coolers and heaters above the drawing chamber) have resulting stresses in the range of 220 to 250 millimicrons per inch.

Under various operating conditions, of course, the observed annealing range and break temperatures might well vary from the temperatures of the examples, used only for purposes of illustration, due both to machine and operating factors as well as to variations in the time of anneal. The primary applicability of the disclosed annealing schedules, from a commercial standpoint, is to processes where the time available for annealing is less than ten minutes and usually between one-half to five minutes. With respect to glass drawing machines, it must be emphasized that no two machines are identical, and the slight differences in surroundings, machine position relative to the melting tank, etc., have a pronounced effect upon the operation of each machine.

As a general rule the annealing herein contemplated is achieved by rapidly cooling the glass from the top of the annealing range to a temperature within 20 to 70 percent of this range (measured from the top thereof and considering the bottom of the range to be 100 percent thereof) and thereafter cooling the glass at a distinctly slower net average rate to the bottom of the range. Normally, the first rate of cooling is at least about 10 percent faster than the linear average cooling rate for the total available annealing time.

The net average rate for any portion of the annealing schedule and the linear average cooling rate for the entire schedule is determined by dividing the temperature drop through which the glass is cooled by the time during which the cooling takes place. For example, if the surface temperature of the glass is lowered 75 degrees centigrade during the entire annealing schedule and the available annealing time is 100 seconds, the average linear cooling rate for the entire schedule, in terms of surface temperature, is 75/100 or 0.75 degree centigrade per second. Alternatively, this rate may be expressed in degrees centigrade per percent of the total available annealing time.

For most purposes the first and faster net average linear rate of cooling should be at least 0.9° C. per one percent of the total available annealing time.

The lower rate may take place as a linear cooling rate from the point of change in cooling rate to the bottom of the annealing range or may occur as two or more cooling rates, for example, a slower rate and then a faster rate. In the latter case the second change in cooling rate may take place in a range of 30 to 95 percent of the annealing range measured from the top of the range, as discussed above. In the former case the change in cooling rate usually takes place within the range of about 20 to 45 percent of the annealing range measured as discussed above.

In general, for best reduction of residual permanent stress when a two-break annealing schedule is being applied to a soda-lime-silica glass of the thickness and the type mentioned in the example and at the times therein contemplated, the first change in the cooling rate within the annealing range should occur between mean temperatures of 585 and 550 degrees centigrade (or between surface temperatures of 575 and 540 degrees centigrade) and the second change should occur at a lower temperature than the first and between mean temperatures of 570 and 525 degrees centigrade (or between surface temperatures of 565 and 520 degrees centigrade). Where a single break annealing schedule is being followed, in which the first rate is more rapid than the second, the change in cooling rates should occur between mean temperatures of about 585 and 570 degrees centigrade (or between surface temperatures of about 575 and 555 degrees centigrade). The ratio of the first net average cooling rate to the second, diminished, net average cooling rate over the balance of the annealing time available, whether as a single- or double-break or other multiple schedule, normally is not more than 10, and preferably is less than 8, but, of course, must be greater than unity.

In the preferred annealing schedules, where the temperature of the glass ribbon is first lowered into the annealing range at a cooling rate more rapid than the next subsequent cooling rate, the change from the first rate to the second, diminished rate should occur before the lapse of about 40 percent of the total available annealing time and in most cases is after the lapse of about 10 percent of such available annealing time. The first net average rate of cooling is at least about 0.9 (rarely being over about 5 to 10) degrees centigrade per one percent of total available annealing time.

To economically achieve the desired reduction in ultimate stress in the glass, it is important that cooling progress substantially continuously. Hence, the net average rate of cooling over any interval of 5 percent of the total annealing time should not be less than 0.2 degrees centigrade per one percent of total annealing time available.

As previously stated, the second cooling may take place in two stages, for example, first at 0.3 degree and later at 0.6 or 1.5 degrees (or even more) per one percent of total annealing time. In such a case the net average cooling rate for the second cooling may be somewhere between the rates of the two stages. The net average cooling rate for lowering the temperature from the range of 575–540 degrees centigrade to the bottom of the annealing range is not above 0.65, usually being not over 0.6 degree centigrade per one percent of total available annealing time (time available for cooling from the top of the annealing range to the bottom thereof).

In an embodiment of this invention utilizing the cooling schedule shown by curve ADC in FIG. 3A, the glass is cooled from about 590 degrees centigrade surface temperature to a temperature below about 560 degrees centigrade over a period which constitutes the major portion of the total available time, normally 55 percent or more of such time. Such first-stage cooling normally takes place either at a uniform rate of cooling or a plurality of rates, but in any event the net average rate of cooling is not less than about 0.2 degree centigrade nor more than about 0.7 degree centigrade per one percent of total available annealing time. Following cooling to a level below 555 degrees but above about 540 degrees centigrade surface temperature, the glass is then cooled at a more rapid rate to complete the annealing in the available time. While this process is effective, it has the disadvantage that the temperature of the glass, remaining high during a major portion of the anneal, may result in undesirable marking of the glass by the drawing rolls or other conveying means as the glass passes through the annealing stage of the operation.

With reference to the specific example previously disclosed in connection with FIG. 10, where a glass ribbon is first cooled from 585 degrees centigrade to 560 degrees centigrade (surface temperature) in approximately 15 seconds of a 100-second annealing schedule (i.e., in 15 percent of the total annealing time), the first net average rate of cooling is:

$$\frac{25° \text{ C.}}{15\% \text{ of total annealing time}} = 1.67° \text{ C. per one percent total annealing time}$$

The glass is then cooled at a decreased rate from 560 degrees centigrade to 545 degrees centigrade in approximately 65 seconds (i.e., 65 percent of the total annealing time) and the net average rate of cooling for the second step is:

$$\frac{15° \text{ C.}}{65\% \text{ of total annealing time}} = 0.23° \text{ C. per one percent total annealing time}$$

The third cooling step alone lowers the temperature of the glass from 545 degrees centigrade to 515 degrees centigrade in 20 seconds (i.e., 20 percent of the total annealing time) and the net average cooling rate for this step is:

$$\frac{30° \text{ C.}}{20\% \text{ of total annealing time}} = 1.5° \text{ C. per one percent total annealing time}$$

Because the second and third cooling steps together lower the temperature of the glass from 560 degrees centigrade to 515 degrees centigrade in 85 seconds (i.e., 85 percent of the total annealing time), the net average cooling rate of the glass from the first break in the cooling schedule to the lower limit of the annealing range is:

$$\frac{45° \text{ C.}}{85\% \text{ of total annealing time}} = 0.53° \text{ C. per one percent total annealing time}$$

FIG. 12 schematically illustrates an annealing lehr 60 and a temperature curve established for annealing reheated glass sheets or plates (such as sheets which are heated above the annealing range to an essentially stress-free condition for the purpose of bending) in accordance with this invention. Heating elements 62 within the lehr on each side of the glass sheets or plates 64 raise the temperature of the glass to a temperature above the annealing range as it is conveyed through the lehr on conveying means such as rollers 66. After the glass has attained a temperature sufficiently above the annealing range to allow the internal stresses to quickly relax, it passes by coolers 68 extending across the inside of the lehr on each side of the glass. These coolers lower the temperature of the glass at a rapid and substantially constant rate to a temperature within the annealing range. Heating means, such as electrical elements 70 within the lehr on each side of the glass, then established a reduced, substantially constant cooling rate until the temperature of the glass has been lowered to a point near the lower limit of the annealing range, after which coolers 72 extending across the width of the lehr on each side and at the exit end thereof rapidly lower the temperature of the glass below the annealing range.

The annealing of glass in the manner disclosed herein will result in a final anneal as low as the minimum anneal obtainable by following the calculated curve of Adams and Williamson but without the expense of maintaining the glass at an elevated temperature over a substantial portion of the cooling cycle and without the difficulty inherent in following a continuously increasing rate of cooling. It should be understood that the foregoing disclosure is intended to cover all changes and modifications of the examples of the invention herein chosen for the purposes of the disclosure which do not constitute departures from the spirit and scope of the invention as set forth in the appended claims.

I claim:

1. In the method of producing sheet glass wherein a glass ribbon is formed from a pool of molten glass and the ribbon is cooled, the improvement which comprises annealing the ribbon during said cooling over an annealing time of less than 10 minutes duration by continuously cooling the ribbon from the top of the annealing range to a temperature range within 20 to 70 percent of the annealing range measured from the top of said range at a rate of at least 10 percent faster than the average linear cooling rate, then further continuously cooling the glass to the bottom of said range at a net average rate which is slower than said first rate.

2. In the method of producing sheet glass wherein a glass ribbon is formed from a pool of molten glass and the ribbon is cooled, the improvement which comprises annealing the ribbon during said cooling over an annealing time of less than 10 minutes duration by continuously cooling the ribbon from the top of the annealing range to a temperature range within 20 to 70 percent of the annealing range measured from the top of said range at a rate of at least 0.9 degree centigrade per one percent of total available annealing time, then further continuously cooling the glass to the bottom of said range at a net average rate which is slower than said first rate.

3. The process of claim 1 wherein the top of the annealing range is between about 585° C. and 590° C., and the bottom is between about 505° C. and 515° C. in terms of surface temperature and wherein the glass is rapidly cooled from the surface temperature of 590° C. to a range of 575 to 540° C. and then is cooled at a net average slower rate not less than 0.2 degree centigrade per one percent of total available annealing time.

4. The process of claim 3 wherein the glass is cooled at said net average slower rate in at least two stages, the first of which is relatively slow, the second of which being relatively fast.

5. The process of claim 1 wherein the net average cooling rate of said further cooling is at least 0.2 degree centigrade for a 5 percent time interval of the total available annealing time.

6. In the method of producing soda-lime-silica glass having an annealing range, the upper limit of which is not higher than about 600° C. and the lower limit of which is not less than about 500° C. in terms of the surface temperature of the glass, and wherein a glass ribbon is formed from a pool of molten glass and the ribbon is cooled, the improvement which comprises annealing the ribbon during said cooling over an annealing time of less than 10 minutes duration by continuously cooling the ribbon from the upper limit of the annealing range to a surface temperature below 575 degrees centigrade but above 555 degrees centigrade at a first net average rate of at least 0.9 degree centigrade per one percent of total available annealing time, then further continuously cooling the glass through the lower limit of the annealing range at a net average rate of not less than 0.2 degree centigrade nor more than 0.6 degree centigrade per one percent of said total annealing time.

7. In the method of producing sheet glass wherein a glass ribbon is formed from a pool of molten glass and the ribbon is cooled, the improvement which comprises annealing the ribbon during said cooling over an annealing time of less than 10 minutes duration by cooling the ribbon from a surface temperature of 585 degrees centigrade to a surface temperature below 575 degrees centigrade but above 555 degrees centigrade at a rate of at least 0.9 degree centigrade per one percent of total available time, then further continuously cooling the glass to a temperature below 515 degrees centigrade at a net average rate of not less than 0.2 degree centigrade nor more than 0.6 degree centigrade per one percent of said total annealing time.

8. The process of claim 7 wherein a net average rate of at least 0.2 degree centigrade per one percent of said total annealing time is maintained over any 5 percent time interval of the total available annealing time.

9. The method of claim 1 wherein the center of the sheet remains under tension throughout substantially all of the annealing range.

References Cited by the Examiner

UNITED STATES PATENTS

| 1,585,542 | 5/1926 | Henry | 65—117 |
| 1,837,311 | 12/1931 | Amsler | 65—119 |
| 2,774,190 | 12/1956 | Atkeson | 65—95 |

OTHER REFERENCES

Textbook of Glass Technology, by Hodkin and Cousen, 1925, pp. 47 to 50.

DONALL H. SYLVESTER, *Primary Examiner.*

UNITED STATES PATENT OFFICE
CERTIFICATE OF CORRECTION

Patent No. 3,251,671                                                      May 17, 1966

Robert Gardon

It is hereby certified that error appears in the above numbered patent requiring correction and that the said Letters Patent should read as corrected below.

Column 1, line 28, for "reduced" read -- reducing --; column 4, line 39, before "glass ribbon" insert -- the --; column 8, line 10, for "526" read -- 520 --; column 9, line 50, for "$R_2$" read -- $R_1$ --; column 10, line 39, for "exists" read -- exits --; line 41, for "the initial" read -- an initial --; line 75, for "extend" read -- extent --; column 11, line 52, for "centigrate" read -- centigrade --.

Signed and sealed this 22nd day of October 1968.

(SEAL)
Attest:

Edward M. Fletcher, Jr.                                            EDWARD J. BRENNER Attesting Officer                                                         Commissioner of Patents